United States Patent
Carlson et al.

(10) Patent No.: US 9,373,123 B2
(45) Date of Patent: Jun. 21, 2016

(54) WEARABLE ADVERTISING RATINGS METHODS AND SYSTEMS

(75) Inventors: Alan Carlson, Lago Vista, TX (US); Richard Wooden, Ogallala, NE (US)

(73) Assignee: IHEARTMEDIA MANAGEMENT SERVICES, INC., San Antonio, TX (US)

(*) Notice: Subject to any disclaimer, the term of this patent is extended or adjusted under 35 U.S.C. 154(b) by 609 days.

(21) Appl. No.: 12/829,158

(22) Filed: Jul. 1, 2010

(65) Prior Publication Data

US 2011/0161163 A1 Jun. 30, 2011

Related U.S. Application Data

(63) Continuation-in-part of application No. 12/649,583, filed on Dec. 30, 2009.

(51) Int. Cl.
G06Q 30/02 (2012.01)

(52) U.S. Cl.
CPC ............ *G06Q 30/0242* (2013.01); *G06Q 30/02* (2013.01); *G06Q 30/0245* (2013.01)

(58) Field of Classification Search
CPC .......................... G06Q 30/02; G06Q 30/0242
USPC ............................................. 382/103; 705/14
See application file for complete search history.

(56) References Cited

U.S. PATENT DOCUMENTS

| | | |
|---|---|---|
| 5,231,674 A | 7/1993 | Cleveland et al. |
| 5,861,940 A | 1/1999 | Robinson et al. |
| 6,173,239 B1 * | 1/2001 | Ellenby .................. 702/150 |
| 6,252,522 B1 * | 6/2001 | Hampton et al. ............ 340/905 |
| 6,459,446 B1 | 10/2002 | Harman |
| 6,577,329 B1 | 6/2003 | Flickner et al. |
| 6,601,021 B2 | 7/2003 | Card et al. |
| 6,842,670 B2 | 1/2005 | Lin et al. |

(Continued)

FOREIGN PATENT DOCUMENTS

| | | |
|---|---|---|
| CA | 2 457 090 A1 | 2/2003 |
| CA | 2 545 202 A1 | 5/2005 |

(Continued)

OTHER PUBLICATIONS

Manabe, H., Fukumoto, M., Full-time wearable headphone-type gaze detector. Extended abstracts of CHI '06, 2006, pp. 1073-1078.*

(Continued)

*Primary Examiner* — Eric Netzloff
(74) *Attorney, Agent, or Firm* — Garlick & Markison; Randy Lacasse (57) ABSTRACT

A wearable advertising ratings method and system is disclosed. The location of a advertising media can be identified and a human eye can be located and tracked when the user of the ratings system, such as a pedestrian, is wearing eye polarity-sensing earphones. The earphones collect data when a user views media, as well as process and transmit such data through the user's communications device. Changes in the eye's polarity, perception, and reaction to viewing media are correlated to human brain reactions to acquire ratings for viewed media. The system allows for an advertiser to acquire and evaluate audience feedback and ratings related to presentation and content displayed on media (e.g., billboards, digital signage, window displays, etc.), as well as provide incentives for rating such media through use of an applications store.

36 Claims, 5 Drawing Sheets

(56) References Cited

U.S. PATENT DOCUMENTS

| | | | |
|---|---|---|---|
| 6,904,408 | B1 | 6/2005 | McCarthy et al. |
| 6,926,429 | B2 | 8/2005 | Barlow et al. |
| 6,962,240 | B2 | 11/2005 | DiFranza et al. |
| 6,972,733 | B2 | 12/2005 | Maguire, Jr. |
| 7,044,602 | B2 | 5/2006 | Chernyak |
| 7,120,880 | B1 | 10/2006 | Dryer et al. |
| 7,261,415 | B2 | 8/2007 | Chernyak |
| 7,331,671 | B2 | 2/2008 | Hammoud |
| 7,344,251 | B2 | 3/2008 | Marshall |
| 7,365,738 | B2 | 4/2008 | Molander et al. |
| 7,391,887 | B2 | 6/2008 | Durnell |
| 7,431,457 | B2 | 10/2008 | Chernyak |
| 7,438,418 | B2 | 10/2008 | Marshall |
| 7,495,631 | B2 | 2/2009 | Bhakta et al. |
| 7,501,995 | B2 | 3/2009 | Morita et al. |
| 7,529,772 | B2 | 5/2009 | Singh |
| 7,561,143 | B1 | 7/2009 | Milekic |
| 2002/0075384 | A1 | 6/2002 | Harman |
| 2003/0142041 | A1 | 7/2003 | Barlow et al. |
| 2004/0117378 | A1 | 6/2004 | Manandhar |
| 2004/0196214 | A1 | 10/2004 | Maguire, Jr. |
| 2004/0196433 | A1 | 10/2004 | Durnell |
| 2004/0220704 | A1 | 11/2004 | Lin et al. |
| 2004/0247183 | A1 | 12/2004 | Molander |
| 2005/0108092 | A1* | 5/2005 | Campbell et al. ............... 705/14 |
| 2005/0116929 | A1 | 6/2005 | Molander et al. |
| 2005/0175218 | A1 | 8/2005 | Vertegaal et al. |
| 2005/0213792 | A1 | 9/2005 | Hammoud |
| 2005/0264890 | A1 | 12/2005 | Morrone et al. |
| 2005/0280603 | A1 | 12/2005 | Aughey et al. |
| 2006/0109237 | A1 | 5/2006 | Morita et al. |
| 2006/0110008 | A1 | 5/2006 | Vertegaal et al. |
| 2006/0146046 | A1 | 7/2006 | Longhurst et al. |
| 2006/0229939 | A1 | 10/2006 | Bhakta et al. |
| 2006/0287913 | A1 | 12/2006 | Baluja |
| 2007/0038516 | A1 | 2/2007 | Apple et al. |
| 2007/0073585 | A1 | 3/2007 | Apple et al. |
| 2007/0081090 | A1 | 4/2007 | Singh |
| 2007/0105071 | A1 | 5/2007 | Weatherhead |
| 2007/0146204 | A1* | 6/2007 | Grabbe ........................ 342/451 |
| 2007/0205963 | A1 | 9/2007 | Piccionelli et al. |
| 2007/0247422 | A1 | 10/2007 | Vertegaal et al. |
| 2007/0273611 | A1* | 11/2007 | Torch ............................... 345/8 |
| 2008/0143674 | A1 | 6/2008 | Molander et al. |
| 2008/0170755 | A1* | 7/2008 | Nasser et al. ................. 382/106 |
| 2008/0259096 | A1 | 10/2008 | Huston |
| 2009/0003252 | A1* | 1/2009 | Salomone et al. ............ 370/311 |
| 2009/0025023 | A1 | 1/2009 | Pradeep et al. |
| 2009/0036755 | A1 | 2/2009 | Pradeep et al. |
| 2009/0062629 | A1 | 3/2009 | Pradeep et al. |
| 2009/0062681 | A1 | 3/2009 | Pradeep et al. |
| 2009/0097705 | A1* | 4/2009 | Thorn ........................... 382/103 |
| 2009/0146775 | A1 | 6/2009 | Bonnaud et al. |
| 2009/0197616 | A1 | 8/2009 | Lewis et al. |
| 2009/0257620 | A1* | 10/2009 | Hicks ............................. 382/100 |
| 2009/0327068 | A1* | 12/2009 | Pradeep et al. ............. 705/14.43 |
| 2010/0086221 | A1* | 4/2010 | Stankiewicz et al. ......... 382/224 |
| 2010/0226535 | A1* | 9/2010 | Kimchi et al. ................. 382/103 |

FOREIGN PATENT DOCUMENTS

| | | |
|---|---|---|
| CA | 2 435 873 C | 10/2008 |
| CN | 200962301 Y | 10/2007 |
| CN | 201035360 Y | 3/2008 |
| EP | 1 032 862 A1 | 9/2000 |
| EP | 1 333 410 A2 | 8/2003 |
| EP | 1 333 410 A3 | 8/2003 |
| EP | 1 583 035 A2 | 10/2005 |
| EP | 1 562 102 B1 | 3/2008 |
| GB | 2 408 164 A | 5/2005 |
| GB | 2 437 575 A | 10/2007 |
| JP | 2006-163900 A | 6/2006 |
| TW | 531402 | 5/2003 |
| WO | WO 99/27412 A1 | 6/1999 |
| WO | WO 00/72289 A1 | 11/2000 |
| WO | WO 03/017203 A1 | 2/2003 |
| WO | WO 2005/046465 A1 | 5/2005 |
| WO | WO 2006/100645 A2 | 9/2006 |
| WO | WO 2007/011092 A1 | 1/2007 |
| WO | WO 2007/022104 A2 | 2/2007 |
| WO | WO 2007/056287 A2 | 5/2007 |
| WO | WO 2006/100645 A3 | 7/2007 |
| WO | WO 2007/022104 A3 | 10/2007 |
| WO | WO 2007/056287 A3 | 12/2007 |
| WO | WO 2008/066460 A1 | 6/2008 |
| WO | WO 2008/141340 A1 | 11/2008 |
| WO | WO 2008/154410 A1 | 12/2008 |
| WO | WO 2009/099875 A2 | 8/2009 |

OTHER PUBLICATIONS

"Eye tracking", *Wikipedia, the free encyclopedia* http://en.wikipedia.org/wiki/Eye_tracking Oct. 22, 2009.

* cited by examiner

WEARABLE ADVERTISING RATINGS METHODS AND SYSTEMS

CROSS-REFERENCE TO RELATED APPLICATIONS

This application is a Continuation-in-Part of U.S. patent application Ser. No. 12/649,583, filed on Dec. 30, 2009, entitled "System and Method for Monitoring Audience in Response to Signage," which is incorporated by reference in its entirety.

TECHNICAL FIELD

Embodiments are generally related to the collection of audience response data for the generation and calculation of advertising metrics. Embodiments are additionally related to wearable eye tracking and brain activity-sensing device. Embodiments are further related to wearable eye tracking and brain activity-sensing device that communicate advertising impression data to data processing devices.

BACKGROUND OF THE INVENTION

Advertising signage is utilized to impart advertising information to people, pedestrians, drivers, passengers, and an audience generally within view of the signage. A billboard is one type of such advertising signage. A typical billboard is a large outdoor advertising structure usually found in high traffic areas, such as alongside a busy road. Advertising signage often shows large, ostensibly witty slogans, and distinctive visuals. In high-density cities, billboards get a lot of exposure with installation in highly visible areas. Billboards are often an ideal place to advertise because the passing public who use the roadways are presented with large, vivid advertisement displays that leave impressions. Rather than an advertiser having to move adverting content to the audience, the audience moves to the advertising content.

Electronic and vinyl posters represent another common form of advertising signage. These types of advertisements are located chiefly in commercial and industrial areas, on primary and secondary arterial roads. Smaller than billboards, posters are principally viewed by residents and commuter traffic, with some pedestrian exposure. Smaller, outdoor advertising displays, such as vinyl or electric posters, are usually prevalent at bus stops, on both the inside and outside of buses, airports, train stations, subways, along busy walkways, in storefronts and other such locations. Smaller displays of electronic and printed matter are also present on smart phones, in taxis, at gas pumps, and in retail stores.

Billboards and poster content is static if printed on paper or other material. Recently, however, the advertising industry began using electronic billboards and digital displays, generally. These digital billboards appear primarily on major highways, expressways or principal arterials, and command high-density consumer exposure, mostly to vehicular traffic. Digital billboards provide greater visibility to viewers than static, content-based display because of the digital billboard's commanding size and the advertiser's ability to perform customizable updates on the digital billboard. Not only can many advertisers share a single digital billboard each month, but an advertiser can change their content in near real-time. These new types of displays are also capable of imparting different advertisements on a single digital display, with each display changing content advertisements over a period of a few minutes.

Electronic billboards and electronic signs are ubiquitous in major cities such as Las Vegas, New York and Tokyo, where large, electronic signs deliver dynamic advertising content to those who view the digital display. Even though the display technologies for these digital billboards may vary widely, all electronic signs and billboards require some type of content source to generate the images presented on the display. Depending on regulatory and technical considerations, this presented content can be, for example, a series of static slides, periodic postings, and/or in some cases, a sequence of broadcast-quality video and animation.

The advertiser's lack of knowledge, however, regarding the use and updates of digital signs is problematic as advertisers do not know how many people actually view the signage and absorb its content. Even if an advertiser knows how many people view an advertisement, the advertiser has no way of knowing if the content of that advertisement made an impression on the viewer and whether it is worthwhile for the advertiser to continue investing in that advertisement, or in that advertisement at that location.

BRIEF SUMMARY

The following summary is provided to facilitate an understanding of some of the innovative features unique to the disclosed embodiments and is not intended to be an exhaustive description. A full appreciation of the various aspects of the embodiments disclosed herein can be gained by taking the entire specification, claims, drawings, and abstract as a whole.

It is, therefore, one aspect of the disclosed embodiments to provide for an improved system and method for monitoring audience response to advertising activity.

It is another aspect of the disclosed embodiments to provide for a system and method for tracking responses of individuals to different forms of advertising using an eye tracking and brain activity-sensing device.

It is an additional aspect of the disclosed embodiments to provide a system and method for tracking and estimating the number of viewers of media advertising, especially as a pedestrian viewer.

It is an additional aspect of the disclosed embodiments to provide a wearable advertising ratings system and related method for detecting variations in eye-polarity of individuals as consumers when the individual is viewing an advertisement, wherein such variations in eye-polarity are recorded and processed and communicated using a mobile device.

The aforementioned aspects can now be achieved as described herein. A wearable advertising ratings system and corresponding method are disclosed. The location of a visual advertisement can be identified, and a human eye can be located and tracked when the individual is wearing an eye tracking and brain activity-sensing device. The device can collect data related to an individual viewing media, as well as process and transmit such data through the individual's wearable communication device. Changes in the location of the communications device, the eye's polarity, the user's perception, and a user's reaction to viewing media can be correlated to human brain reactions to acquire ratings for the media that is viewed by the user The system allows for an advertiser to acquire, estimate and evaluate audience/consumer impressions and feedback to generate ratings related to signage locations, presentations and content displayed on such media including billboards, digital signage, window displays, and other such signs or displays.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in the non-limiting examples described herein can be varied and modified and are cited merely to illustrate one or more embodiments of the novel concepts herein and are not intended to limit the scope thereof.

Figure 1:
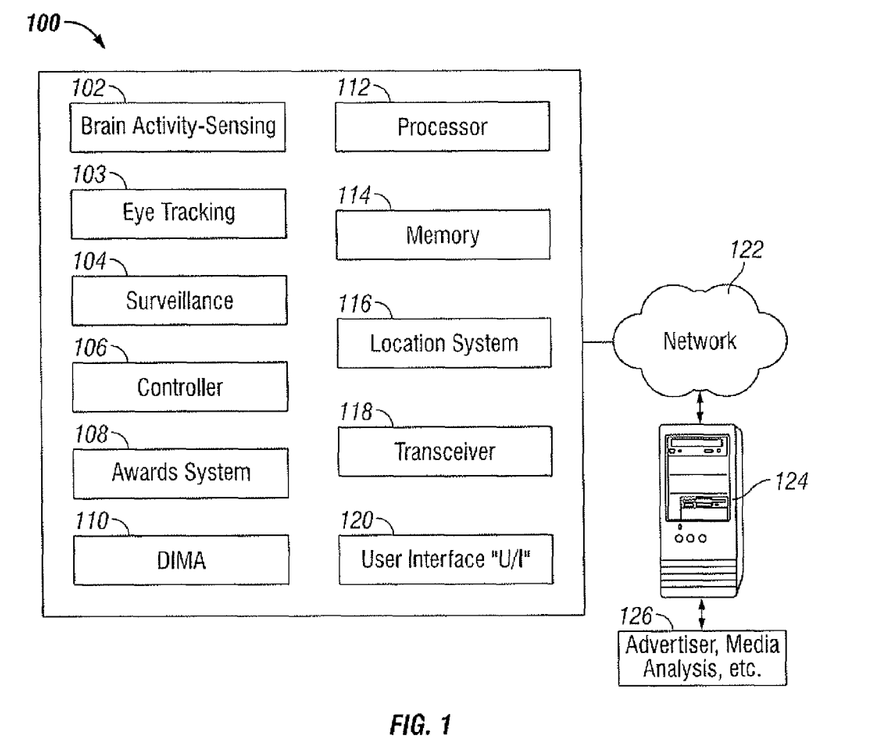
FIG. 1 illustrates a block diagram depicting a system for monitoring media viewing activity and audience/consumer impressions, in accordance with the disclosed embodiments.

FIG. 1 illustrates a block diagram of a system 100 for monitoring media viewing activity, in accordance with the disclosed embodiments. Note that in FIGS. 1-8, identical or similar parts or elements are indicated by identical reference numerals. System 100 can be implemented, for example, as a data processing apparatus or other computing device, depending upon design considerations. In some embodiments for example, the data processing apparatus or system 100 can be configured as a wearable data processing apparatus or device worn by a user. In other embodiments, the data processing apparatus or system 100 can be configured as a device such as a Smart Phone or other computing device. System 100 as depicted in FIG. 1 can include, in some embodiments, a wearable brain activity-sensing device or module 102 and an eye tracking device or module 103 that can monitor the relative direction of an eyeball of an individual with respect to a relative direction of signage that is in the field of view of the eyeball. The wearable eye tracking module 103 and possibly the brain activity-sensing module 102 can be configured to monitor the relative movement and direction of the eye(s) of an individual, or possibly the movement and relative direction of the user's lens or iris to determine or estimate a user's field of view.

Note that in some embodiments the brain activity-sensing module 102 and the eye-tracking module 103 may be combined into a single integrated unit, while in other embodiments, the devices or modules 102 and 103 can be separate devices that communicate electronic with one another and with other devices and modules such as the transceiver 118, the user interface 120, the location system 116, memory 114, processor 112 and so on. It can be appreciated that components such as the eye tracking device or module 103, the brain activity sensor device or module 102, the processor 112, memory 114, and so forth can communicate with one another via an electronic data bus (not shown in FIG. 1).

System 100 can be configured to also include a wearable surveillance module 104 that can be head mountable. When an advertisement sign comes into view of the user, for example, the surveillance module 104 can be instructed to record content or information displayed on the signage by taking one or more pictures of what is in the user's field of view, such as the signage content in the user's field of view. The recorded content and the relative direction of the eyeball can be indexed in real time such that the content and direction can be correlated to determine what the individual is seeing or experiencing during a particular time duration. In some embodiments, at least part of the surveillance module 104 can be a camera integrated into a mobile communications device having multiple functionalities, such as a Smart phone or personal digital assistant. In some embodiments, images recorded by the surveillance module 104 can be sent to a remote server in real time, or at some time after the image of the sign content is recorded by the device 100

The surveillance module 104 can communicate with the eye tracking module 103 and brain activity-sensing module 102 to correlate data collected from the surveillance module 104, the eye tracking module 103, and the brain activity-sensing module 102, on the mobile communications system/device 100, which can also be referred to for example, as a wearable computing device or a wearable data processing apparatus, depending upon design considerations and goals. The data collected can be indicative of an impression made on a user when the user has been exposed to the signage content that has made an impression on the user. Such phenomenon can be referred to as a positive posting. A positive posting enables a valuation of signage exposure or impressions made by content displayed on static or dynamic signage media, such as, for example a billboard along a highway or a sign in a storefront. As digital signage can change content often, tight or real-time correlation can provide an accurate result concerning a number of impressions or impressions made on specific passersby or the number of impressions that specific sign content receives.

System 100 can additionally include processor 112 for processing and correlating the user, content, location, surveillance, direction, velocity and field of view data collected by the system sensors such as from the surveillance module 104, eye tracking module 103, brain activity-sensing module 102 and the location detection system 116. The location detection system 116 can include at least one sensor that detects the location and velocity of the system 100 or the user, relative to the earth.

Such systems can detect location and velocity with a cellular communications system using tower directions and a process know as triangulation in a network location system, such as a wireless local area network location system, a GPS system, or a beacon type system, for example. The surveillance module 104 may also record the proximity of multiple individuals to the signage. All of the information gathered can be stored in the wearable device locally. The data can then be used by a remote computing device to determine parameters, such as a number of impressions and an effectiveness of specific content on one or more signs.

The location and orientation of the user's eyeball can be used to determine the user's field of view defined by a locus of points (defining a cone). This locus of points can be compared to and coordinated with the latitude and longitude information of the corners of the sign (defining a plane) in two dimensional space to determine if the user is being, or has been, exposed to the content on the sign. In some embodiments, the location can be quantified by a street address. Using coordinate information resources and digital imagery, the location of a sign and what sign is in the field of view when the user is at a particular address facing a particular direction can be determined. For example, information and technology such as that utilized by Google® in Google® Maps and Google® Street views could be utilized to estimate and determine impressions.

In these embodiments, the location of the user and the direction that the user's eyeballs are pointing can be "superimposed" or overlaid on the Google® Map and Google® Street view. Such data can be used by either another human or by a matching executing code to determine if specific content on a sign comes into the field of view of user. In some embodiments, a trigger is created in response to a user being located a predetermined distance from a sign and possibly facing a particular direction. The trigger can then trigger the human or machine-driven detection process where the machine or user is placed at a specific location in the street view location. Thus, detection can be made by using virtual reality or augmented virtual reality. Therefore, in some embodiments, an individual (a monitor) could be remotely collecting data and viewing or seeing what the user sees and can then make a determination whether the user sees and possibly dwells on a sign.

In some embodiments, a remote computer can use virtual reality and sign recognition software using Google's® street view data to determine an individual's exposure to specific signage. The location and orientation of the user's eyes can be utilized to determine or estimate what the user is viewing, or has previously viewed. The user's impressions or exposure to signage content can then be determined by server 124 to correlate information obtained from the eye-tracking module 100 and from sign location/content database 128. The sign location/content can track what content is on what sign during a specific time period. The eye-tracking module 103 can be co-located with many different location, direction and velocity sensors. Information provided by these sensors can be correlated with a signage location detection system or data in the database 128 to correlate and provide positive information about the signage information viewed by the user. In advertising terms, this can allow an advertising agency to relate proof of performance or "posting" to the advertiser for the advertisement displayed. In some embodiments the system 100 can provide automated reporting to the advertisers or the advertising agencies.

As further illustrated in FIG. 1, memory 114 can store information outputted by the eye tracking module 103, the brain activity-sensing module 102, and the surveillance module 104. Memory can 114 also store operating instructions for execution by the processor 112. Note that the processor 112 can be implemented as, for example, a CPU (Central Processing Unit) or the portion of a data-processing system/apparatus (e.g., a computer, server, etc) that carries out the instructions of a computer program as the primary element for carrying out the data-processing functions of such a computer (not shown). Processor 112 may also be implemented as a microprocessor, which incorporates most or all of the functions of a CPU on a single IC (Integrated Circuit) or a group of electronically interlinked IC's.

Memory 114 may be embodied as, for example, a flash memory or another non-volatile computer storage medium that can be electrically erased and reprogrammed. In some embodiments, memory 114 can be embodied as a memory card or even a removable uniform serial bus (USB) flash drive for storage and transfer of data between the system 100 and other computers or other digital products, possibly products that can process the stored information and provide a report regarding user impressions. In some embodiments, memory 114 can also be a specific type of EEPROM (Electrically Erasable Programmable Read-Only Memory).

The system 100 can be configured to further include a controller 106, which may be, for example, a chip or extension card that interfaces with both the eye tracking module 103, brain activity-sensing module 102 and surveillance module 104. The controller 106 can also function as a link to the memory 114 and other devices external to system 100. While a user is viewing media content, the location detection module 116, discussed herein, within the individual's mobile communications device, can generate time and place data to define the time that the individual is at a specific place on the surface of the earth. The location detection module 116 can continue collecting data regarding the individual's location as that individual moves in relation to signs and specific media content. The location information can be collected and stored in the individual's mobile communications device, which may then be transmitted to a server 124 operated by a service provider at a remote location for processing.

In some embodiments, the eye tracking module 103 and brain activity-sensing module 102 may receive a beacon when they are in proximity to the location of the sign content, thus activating the impression determination system including the transmission of media viewing data from the wearable system 100 on the user to a service provider's server 124 at a remote location.

The system 100 can communicate information, and transmit and receive data through the transceiver 118. For example, the server 124 can query the system for data, and can provide the system with instructions. The impression related data can be received and processed by the server 124 to create usable impression data. The data and the communication protocol can be, for example, cellular based, wireless network based and/or accomplished utilizing, for example, HD radio transmissions. A user interface 120 can be provided for a user or a service provider to view collected impressions data on the individual's mobile communications device or other computer-implemented device. Further, either a portion or all of the collected data may be processed by the user's mobile communications device for an impressions rating. The user's mobile communications device may also transmit this processed, or raw, collected viewing data.

The system 100 can communicate with a network 122, which in turn can communicate with one or more servers, such as a server 124. The network 122 may comprise, for example, a cellular communications network, which is a radio network composed of radio cells (or simply "cells") served by at least one fixed-location transceiver known as a cell site or base station. These cells cover different land areas to provide radio coverage over a wider area than the area of one cell, so that a variable number of portable transceivers can be used in any one cell and moved through more than one cell during transmission.

Network 122 may also constitute, for example, a wireless network such as an 802.11 network and variations thereof. In other embodiments, network 122 can be, for example, the Internet, which is the global system of interconnected computer networks that use the standardized Internet Protocol Suite (TCP/IP) to serve billions of users worldwide. The Internet is a network of networks that includes millions of private and public, academic, business, and government networks of a local to global scope that are linked by copper wires, fiber-optic cables, wireless connections, and other technologies. The Internet carries a vast array of information resources and services, most notably the inter-linked hypertext documents of the World Wide Web (WWW) and the infrastructure to support electronic mail.

As indicated by the embodiment depicted in FIG. 1, data can be collected by the eye tracking module 103 and brain activity-sensing module device 102, the locating system and the surveillance module 104 and the collected data can be processed by the processor 112 and then automatically uploaded via a wireless interface through network 122 (e.g., cellular network, Wi-Fi, etc) to one or more server(s) 124, where such data can be processed to create valuable, usable data. This data can be stored and then retrieved by an advertiser 126, or other media analyst, for evaluation and review.

Figure 2:
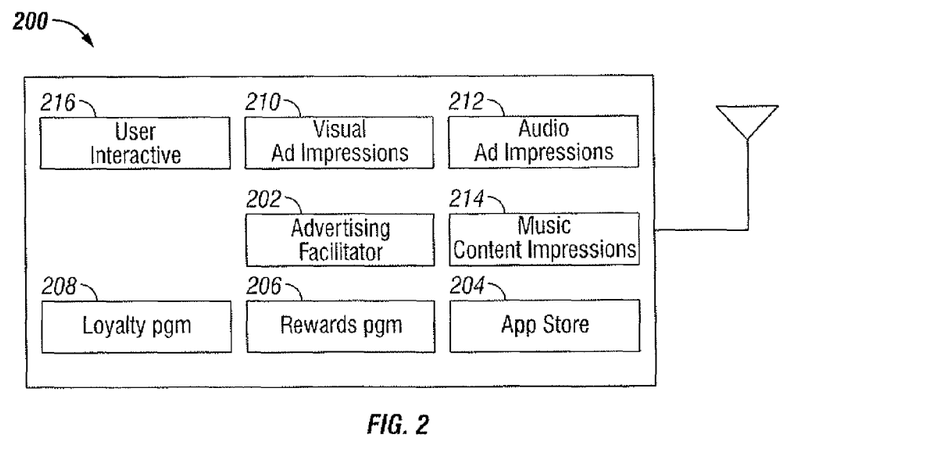
FIG. 2 illustrates a block diagram of an applications store including a promotions, rewards and instructions module for use in accordance with the disclosed embodiments.

Referring to FIG. 2, illustrated is an online store 200 that can be provided by an advertising facilitator 202. From the online store 200, the advertising facilitator 202 can provide downloadable applications for use by a user's portable device. Thus, a user or individual can download, utilize, and operate different user impression monitors. The user can also download data and sync the user's wearable communications device as described with respect to FIG. 1. The loyalty program module 208 allows the advertising facilitator to provide rewards to the users (free or discounted goods and services), in exchange the advertising facilitator collecting data on user's views and reactions to particular or specific signage content. The online store 200 can also use polling, interactive e-mails, and SMS messaging to actively request and acquire user reactions. In addition, the loyalty program module 208 can facilitate user loyalty programs.

As stated above, the application store 204 can facilitate the download of an impressions monitor application (DIMA) 110 having at least some of the functionality described with respect to the description of FIG. 1. Thus, such instructions can be downloaded from the online or service provider 202 through, for example, both the applications store 204 and/or the rewards program 206. The Transceiver (TX/RX) 118 in FIG. 1 can be utilized to facilitate the request for, and download of, the DIMA 110 from the applications store 204. The service provider 202 can operate as a clearinghouse for data, serving as both a compiler and seller of advertising effectiveness data.

In some embodiments the application download can include a visual advertisement impression module 210, an audio advertisement impression module 212, and a music content impressions module 214. All of these impression modules 210, 212 and 214, along with the user interactive module 216, can be downloaded to the wearable device via the applications store 204. The impression modules 210 212 and 214 provide a passive data capture system. The user interactive module 216 facilitates two-way communications with users. For example, the user interactive module can poll a user of the wearable device to see whether the user views particular content on a sign, or whether the user likes a song that is played on the radio or through the user's computer. This polling can occur on the wearable device or on the user's computer. In response, the user can answer questions and provide feedback to determine advertising effectiveness and listenership, as with other advertising ratings systems.

The user interactive module 216 facilitates communication with the user regarding the impression a viewable or an audio advertisement has made. In addition, because the location of the user is known, the interactive module 216 can be used to send geographically targeted advertisements based on the exact location of the user. The Interactive module 216 can also be utilized to acquire the user's behavioral trends and demographic information to send advertisements based on the user's behavior, demographics, or a combination thereof.

In some embodiments, the effectiveness of geographic, behavioral and demographic ads can be determined by the systems in the disclosed embodiments. Further, user, consumer, or audience feedback can be acquired through such systems disclosed. Such advertising effectiveness can be measured in the form of the public's reaction based on individual's impression of various types of advertising methods and various types of advertising content. In some embodiments, audio from radio station-type feeds can be monitored for impressions. Advertisements can be substituted in the audio at the user's machine based on user input, a user's reaction to a sign, or other information learned by the system.

The service provider 202 could further implement a user rewards program though the rewards program module 208. After an individual registers with and provides advertising related data to the advertisement facilitator 202, the user can be rewarded for sharing their individual geographic location information, demographic habits, behaviors, desires, or impressions with the advertising facilitator 202. The rewards program module 202 can provide a user with a plan or program that provides free goods or services or coupons, discounts reduced prices on services or products based on the amount and type of data provided by the user of the DIMA 110 in FIG. 1.

In some embodiments, the system 200 can be passive and acquire user related data in an entirely automated process. In other embodiments, the system 200 can be interactive where a user can be queried to see if the user viewed specific content of the advertisement. The interactive system can further query the user to determine if the user wants additional information, coupons, or some sort of an upgrade, deal or promotion. The advertising facilitator 202, via the rewards program, may also provide an incentive for the user to provide feedback as to whether the user viewed specific content and the user's reaction to such content, such as a "thumbs up" and a "thumbs down" selection, or a question to see if the user knows exactly what is being advertised. A user could also request additional information that is related to the advertisement's content through the system 200.

Figure 3:
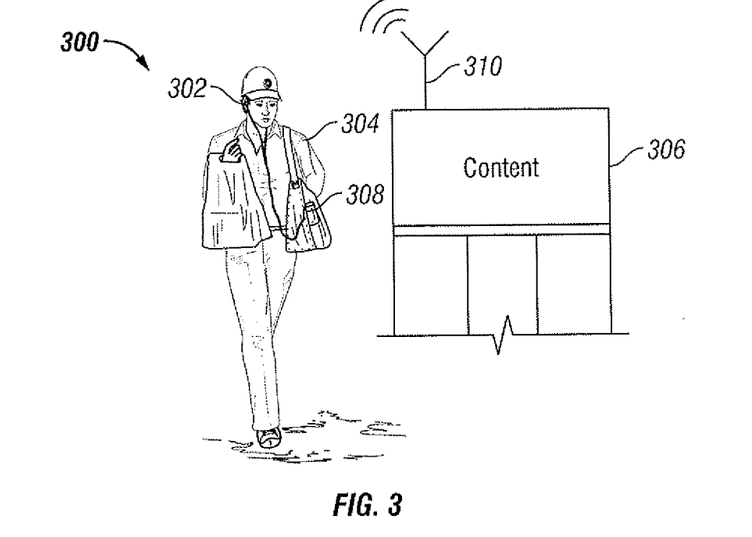
FIG. 3 illustrates a pictorial diagram of an individual equipped with an eye tracking and brain activity-sensing device, in accordance with the disclosed embodiments.

FIG. 3 illustrates a pictorial diagram of a user 304 equipped with a wearable system 300 for monitoring media viewing activity embodied at least in part as a head-mountable module that includes a set of earphones 302. Note that the earphones 302 can be, for example, a pressure transducer. The system 300 can include an eye-tracking module 302, a computing module with a transceiver and a user interface, and a surveillance device 308 all previously disclosed herein. Part of the system 300 can be collocated with earphones 302 and comprised of a number of eye tracking sensors, location sensors, direction sensors, and brain activity sensors, and rewards and instructions processing equipment, as previously disclosed with respect to FIG. 2. Another part of the system 308 can be collocated with a cell phone device.

The eye tracking module can be located within the ear, behind the ear, or at other positions on the user's head such that the eye tracking and brain activity-sensing modules can monitor the polarity and direction of the eyeball in relationship to geographic coordinates. Thus, one or more eye tracking sensors can be attached to the user's 304 body or head to track a user's eye movement and polarity as the eye moves and focuses on surrounding signage content. Such signage content may include, for example, content posted on a sign 306, digital signage, window displays, and government-provided traffic safety signs, such as speed limit signs and walk/don't walk signs (not shown).

To identify individuals using the system 300, many types of Near Field Communication methods (NFC) can be implemented 310. NFC can generally be thought of as short-range wireless connectivity. Some NFC standards, including Ecma-340, and ISO/IEC 18092, use magnetic field induction to enable communication between devices. NFC is construed broadly to allow for a device to establish "peer-to-peer" (P2P) exchange data when brought in proximity to each other. After the P2P network has been configured, another wireless communication technology, such as Bluetooth or Wi-Fi, can be used for longer-range communication or for transferring larger amounts of data.

Some examples of how NFC can be used are as follows: based on the direction of an eye, a user's cookies or data can be transmitted from a mobile communications device to a media location. The media could then log the number of user impressions, with the impressions then transmitted to a service provider at a remote location for processing and correlation. Such NFC can activate an interaction between the user and the advertising facilitator.

Figure 4:
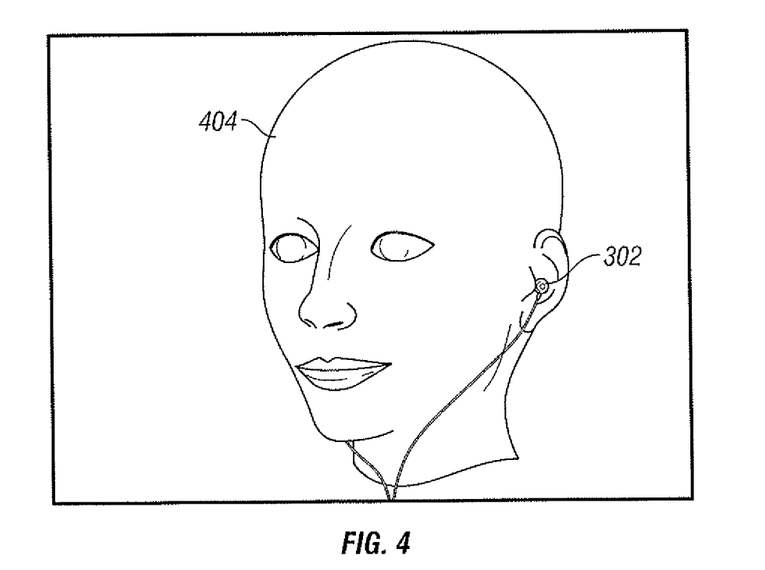
FIG. 4 illustrates a pictorial diagram of a particular eye tracking and brain activity-sensing device, which can be adapted for use in accordance with the disclosed embodiments.

FIG. 4 illustrates a pictorial diagram of a particular eye-tracking device 302, in accordance with an embodiment. Note that the eye-tracking device 302 can be implemented in the context of different embodiments, such as earphones, headphones, ear buds, or other similar, wearable devices. Eye tracking device 302 can include, for example, pressure transducers and is analogous to the eye tracking device or module 102 shown in FIG. 1 and can function in accordance with other disclosed components such as, for example, the various modules and components also shown in FIG. 1, FIG. 2, FIG. 3, and so forth.

The eye-tracking device 302 depicted in FIG. 4 can be configured to measure either the point of gaze, or where the user 404 is looking, or the motion of a user's 404 eye(s) relative to his or her head. The eye-tracking device 302 can measure eye positions and/or eye movement by utilizing a non-contact and optical component and methodology for measuring eye movement. A simple glance by a user 404, for example, can be recorded as an impression, which can be utilized to compute a tally that enables measurement metrics that advertisers associated with a billboard 306, may rely upon for the effectiveness of an advertising campaign.

In the embodiment depicted in FIG. 4, a user can wear an eye-tracking device 302 when the user views advertising media. While the eye-tracking device 302 in this example consists of earphones worn in the individual's ears, other embodiments of the eye-tracking device may include different headphones or earpieces. These headphones may be located in any position on or around the individual's head. The function of the eye-tracking device remains the same whether the individual wears eye-tracking earphones, earpieces, or headphones located anywhere on the individual's head. Any embodiment of the eye-tracking earphone 302 worn by an individual will recognize when an individual views media, as an eye movement sensor in the earphone communicates movement data to a general motion sensor in the eye-tracking device. The general motion sensor detects if that individual is moving. If the individual is moving, the general motion sensor measures how fast that individual is moving and records this data.

A user 404 can wear an embodiment of the above disclosed system 100 as eye polarity-sensing earphones that utilize electrooculograms or electroretinograms electrodes to detect discrete differences in eye-polarity and perception with respect to information displayed on advertising media external to and in view of the individual, such as, for example, the sign 306 shown in FIG. 3. The eye is positive at the cornea and negative at the retina. As the eyes move, the potential around it changes, and these changes can be used to control things. For example, a user's mobile communication device could record when the eye-polarity sensing earphones detect that a user's eye is looking left or right and returning to the center. The earphones could also detect when the eye is moving in a clockwise or counterclockwise direction. The eye polarity-sensing earphones also measure the dwell time—or how long an individual has to view something—of an individual wearing the headphones as the individual views the media. In addition, the eye-polarity sensing earphones can monitor additional parameters such as duration of eye contact with the sign, scanning of the sign, changes in features of the face such as smiling or frowning, the direction the face is pointed. These changes can be converted into advertising metrics such as number of impressions, duration of attention, demographic information of the viewer, what the viewer is wearing, how fast moving etc.

The brain's reaction when the individual views the media is detected and recorded by brain activity sensors and brain location activity sensors located within in the eye tracking and brain activity-sensing device 102. The individual's brain activity, when viewing the media, controls how the brain activity sensors and the brain activity location sensors collect and communicate data with the individual's mobile communications device. This reaction data is sent to the individual's mobile communications device, where it can be processed and transferred into quantitative data, indicating an individual's reaction to specific media. The data may also be sent to a data collecting and processing service for further quantitative analysis. Piezo electric sensors, a timer and the eyeball polarity sensor can detect if a user's eyes move to view signage and how long a user looks at the signage.

Figure 5:
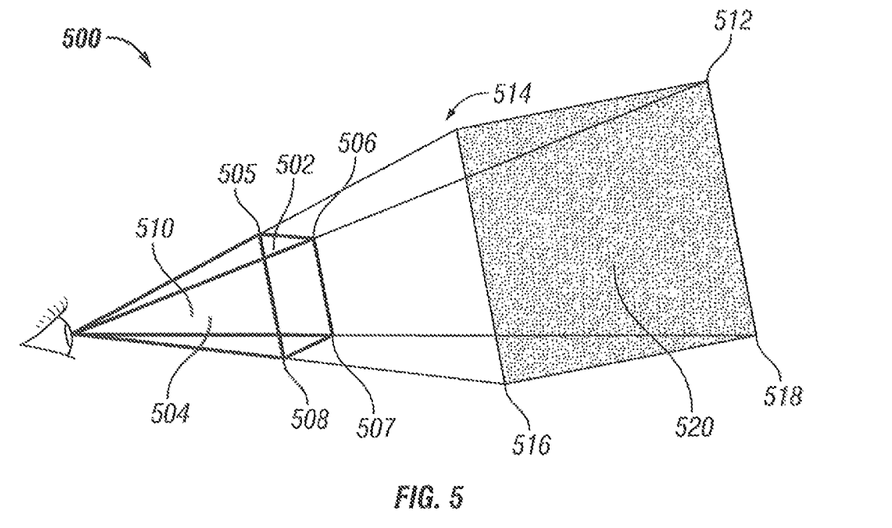
FIG. 5 illustrates an orthogonal diagram of a typical individual's field of view when viewing media advertising, in accordance with the disclosed embodiments.

FIG. 5 illustrates an orthogonal diagram 500 of a typical individual's field of view 504, or what is in an individual's field of view. Such dimension can be used to determine if an individual is viewing an advertisement. Although the field of view can be defined by a locus of points that define a pyramid as shown, a conical locus of points also describe a typical uses field of view. When a user is wearing the system for monitoring media viewing activity 100 and viewing the advertisement, the user's field of view 504 can be defined by a locus of points based solely on the location and direction of the eye of the user. In some embodiments the system can calibrate the field of view for each user by asking the user what the user sees in their field of view to define or customize a field of view parameter for each user. This customized field of view parameter can be formulated by knowing the location of a sign, and the eyeball's location and direction, along with asking the user if the user sees particular content at various distances and directions. The field of view is then calibrated accordingly using that information.

In some embodiments, a field of view can be calculated that accurately describes the field of view for a large percentage of the population. Such a field of view can be utilized to determine if the user has or is visually engaging the sign. This field of view 504 can be defined by, for example, points that define the corners of the pyramid and all points in between. In other embodiments points 505, 506, 507, 508, can define the outer boundary of the field of view with points 512, 514, 516 and 518 defining the outline of a squared or rectangular-shaped sign. The user's field of view 504 can be defined as all points that are inside of the pyramid. Corresponding to the outline of the advertisement, a user with good vision (i.e. 20/20) may have a field of view 504 defined that projects at least to the sign 520, such that the locus of points 505, 506, 507, 508, intersect the locus of points defined by 512-518, where the sign 520 would be in the field of view of the user All points and locus of points can be defined in terms of latitude, longitude, and elevation of the sign.

A database can store the locus of points that define the plane of the sign as it relates to coordinates, or a street addressed on the earth. The user's field of view 504 can be determined as a locus of points that define a cone and the cone's orientation relative to the earth using the latitude and longitude coordinates or a street address.

In some embodiments such information can be transferred into relative spatial coordinates or other coordinates such as a street address and/or identifying data using, for example, a conversion system such as the Google™ conversion system and/or, for example, Reverse Geocoding utilizing web services, such as GeoNames™ or other appropriate systems and/or devices. Because the signage locations can be stored in a sign location database as a locus of points, in addition to street addresses of the signs, the location detection system 116 of the system 100 can locate and transmit the signage location using data contained in the aforementioned sign location database. A remote computer server can then compute the locus of points that define the sign and the locus of coordinates that define the user field of view. The server can then determine if the sign is within the user's field of view. A sign's elevation data can be determined using many different methods, including using elevation data acquired by the Shuttle Radar Topography Mission (SRTM), the Aster Global Digital Elevation Model (Aster GDEM), or the GTOPO30 Global Digital Elevation Model (DEM), and so forth.

Figure 6:
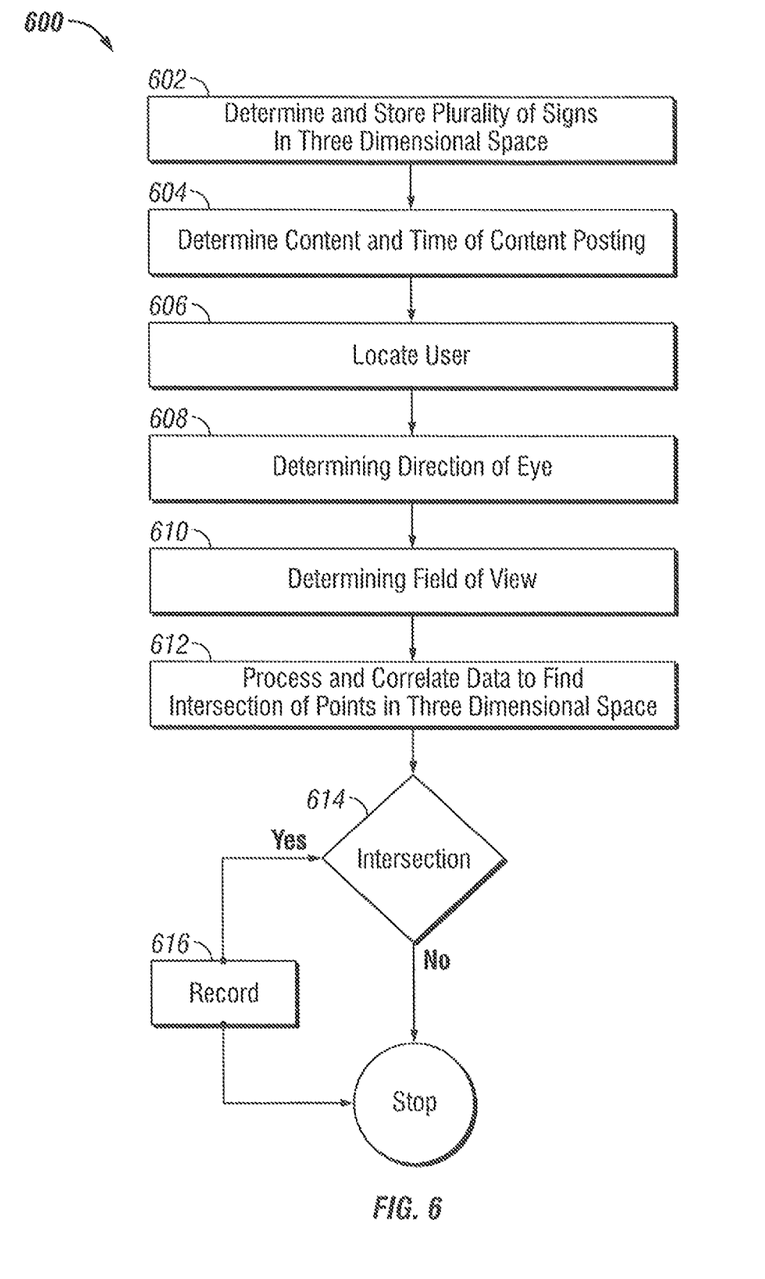
FIG. 6 illustrates a high-level flow chart depicting logical operation steps of a method for tracking mobile viewers of media advertising, in accordance with the disclosed embodiments.

FIG. 6 illustrates a high-level flow chart depicting logical operation steps of a method 600 for tracking a user's viewing of advertising content, in accordance with the disclosed embodiments. It can be appreciated that the various steps depicted in FIG. 6 can be implemented in some embodiments by executing a program instruction in a data-processing apparatus, such as a processor, a computer, a server, etc.

As indicated at block 602, the location of a plurality of signs can be determined. In addition, a locus of points can be determined that define the size of the sign. Thus, the location of a sign in three-dimensional space can be determined and defined by a locus of points in three-dimensional space with reference to a predetermined location. As depicted in block 604, time intervals and content associated with a particular sign can be stored. As depicted in block 606, the location of a user can be determined relative to the predetermined location.

As depicted in block 608, it can be determined what direction an eyeball is focused. Based on the direction of focus, a field of view of the eyeball can be determined as a locus of points in space as depicted in block 610. As illustrated in block 612, the locus of points can be compared to determine if there are intersection points. As depicted in block 614, if there is an intersection of points (points common to both the field of view and the sign definition), then an impression can be recorded and the process can end.

In one embodiment, this process can be initiated by a beacon or a location detection system. The field of view can be determined using a surveillance sensor that monitors the location and relative direction of the eye(s), the terrain and an average distance from the user where signage exists utilizing an eye location and direction monitoring device. Thus, a sensor on the user can detect signage and the distance of signage using radar or sonar technology. In some embodiments, the information displayed on the sign can be determined utilizing a time duration and location data from a signage location database device that communicates with the wearable system.

The signage location, signage view time, and signage content can reside in a central server at a remote location where its connected to the Internet and possibly a cellular communications system. In some embodiments the eye-tracking device can send out both location and field of view information to the remote server. The field of view can be a latitude/longitude coordinates-enabled system indicating a positive posting of the viewing information, including correlation of the eye movement and outdoor view to the actual surrounding billboard display devices. This information can be utilized to enable a valuation of the displayed advertising information. The method 600 thus enables eye tracking for mobile viewers, as pedestrians or as riders in a vehicle.

Figure 7:
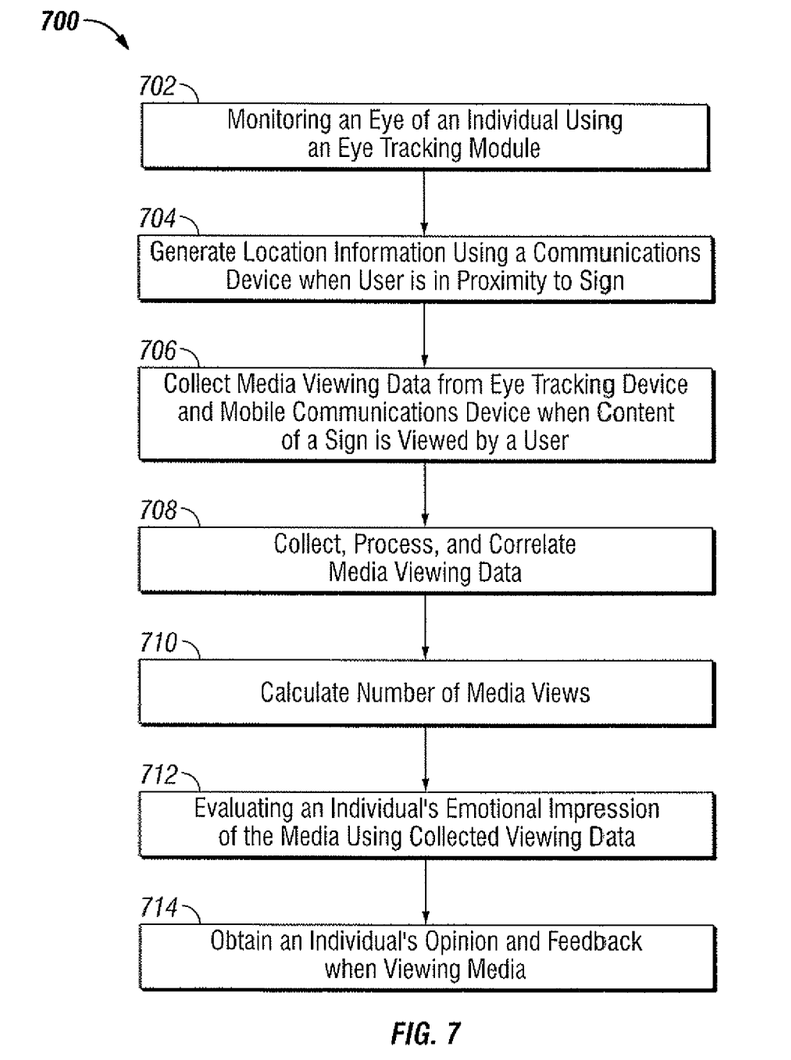
FIG. 7 illustrates a high-level flow chart depicting logical operational steps of a method for a wearable advertising ratings system, in accordance with the disclosed embodiments.

FIG. 7 illustrates a high-level flow chart depicting logical operation steps of a method 700 for wearable advertising ratings, in accordance with the disclosed embodiments. As depicted in block 702, an operation can be implemented for monitoring the eye(s) of an individual either in a vehicle or as a pedestrian utilizing an eye tracking device, such as, for example, eye polarity-sensing module mounted proximate to earphones. Examples of such an eye-tracking device include the eye tracking device or module 103 shown in FIG. 1 and the device 302 shown in FIGS. 3-4.

Next, as depicted at block 704, location information can be utilized to determine if a user is in proximity to a sign. The location can be determined by the wearable device, such as for example, a mobile communications device, such as a SmartPhone, a "Blackberry" device, an "iPhone" device, and so forth. The sign can have a transmitter and be connected via a mesh network to broadcast location information, including geo-coordinates for reception by a mobile communications device. The mesh network can also coordinate location information with specific advertisements relative to location and other advertisements related to the mobile communications device location.

As described at block 706, media viewing data can be collected from the eye-tracking device and the mobile communication device when content of a sign is viewed by a user. In addition, perception and reaction data can be collected from the wearable system. In some embodiments, when it is determined if the user has viewed media, a brain activity sensor can determine if the viewing of the content generated brain activity. Changes measured in the eye's potential and brain activity related to a user's reaction or perception, excitement confusion, etc. can be processed into quantitative data, indicating an individual's reaction to specific media. The data may be sent to a data collecting and processing service for further quantitative analysis. Thus, as indicated at block 708, the data collected from the mobile communications device and the eye tracking device can be processed and correlated such that the data is indicative of a positive posting of the information and can be utilized to enable a ratings valuation of the displayed information (e.g., advertisements).

In some embodiments the device determines a user's location and can determine a field of view of the user in two or three dimensional space, where the field of view can define or quantify a section of space that is likely visible space or area to the user. The device can also determine a direction of the field of view of the user based on which direction the eye or head of the user is oriented. This data can be utilized to locate a section of space where the user is likely viewing something such as signage or media. This user viewing data and/or section of space location can be communicated from a wearable device to a remote location possibly a data-clearing house where the data can be processed. Using this data at least one sign can be identified from the plurality of signs that is located in this section of space.

Thereafter, as described at block 710, the processed and correlated data can be assessed to determine the number a user viewed a particular advertisement. This determination can use a statistical analysis. As depicted in block 712, an impressions ratings valuation of the displayed information or content can be determined. As depicted in block 714, a user can be queried to see if the user viewed specific content of the advertisement and whether that user has feedback for that advertiser regarding a particular display.

Changes in the eye's polarity, perception, and reaction to viewing media can be correlated to human brain reactions to acquire ratings for viewed media. The method 700 thus enables eye tracking for mobile viewers, including correlation of the eye movement and changes in eye polarity, perception, and outdoor view to the actual surrounding media display devices.

System 700 can also, in some embodiments, utilize the location detection system 116 discussed herein, or other electronic compass instrumentality located within a mobile communications device, to determine the location of the media relative to the mobile communications device. The location detection system 116 can be configured to communicate with the mobile communications device, transponder located on the media itself.

Based on the foregoing it can be appreciated that methods and systems are disclosed for acquiring user viewing, in accordance with varying embodiments. Such a method can include particular instructions or method steps, which can be executed via a program instruction in a data-processing apparatus, such as, for example, the system 100 and/or the server 124 shown in FIG. 1. It can be appreciated that such program instructions can be executed in a single data-process apparatus, such as a computer, server, or etc, or may be executed by multiple and varying types of data-process devices, depending upon design considerations.

Thus, a method for acquiring user viewing can be implemented, which includes determining the locations of one or more signs, such as, for example, sign 306, in at least two-dimensional space, along with determining the location of the user (e.g., user 304 or 404). Such a method can further include determining the field of view of the user in at least two-dimensional space, determining the direction of the field of view of the user utilizing the eye-tracking device 103, communicating the direction of the field of view to a remote location, and identifying the location of one or more signs (e.g., sign 306) that is within the direction of the field of view of the user at the remote location.

In other embodiments, such a method can be modified to include communicating the direction of movement of the user, and determining the direction of the field of view of the user based on the direction of movement of the user. In still other embodiments, such a method can be modified to include determining a probability that the user views the at least one sign utilizing parameters comprising the location of the sign(s), the location of the user, the field of view of the user; and/or the direction of the field of view of the user.

In still other embodiments, such a method can include determining a rating valuation of the at least one sign based on a probability that a number of users have viewed content associated with the sign(s), defining a locus of points in three-dimensional space, wherein the locus of points defines a plane having latitudinal and longitudinal coordinates, and/or defining the field of view utilizing a locus of points in three dimensional space defined in a shape of one of a cone or a pyramid. In other embodiments, such a method can include determining the intersection of points in the field of view locus with the locus of points in three-dimensional space defining the sign(s).

In other embodiments, such a method can include utilizing the parameters at a remote location to determine advertising campaign success metrics, detecting the direction of the field of view further comprises detecting a difference in electric potential proximate to at least one eye of the user, and/or detecting the field of view in two dimensional space utilizing at least one of a direction of movement of the user, a head orientation of the user, a relative eye orientation, and/or at least one predetermined distance to limit the locus of points that defines the field of view of the user.

Additionally, in other embodiments, such a method can include monitoring brain activity associated with the user utilizing the brain activity-sensing device or module 102, and relating the brain activity, and the content of the sign(s) when the content of the signs(s) is within the field of view of the user. In still other embodiments, such a method can include correlating user-viewing data with the brain activity of the user, and the content. In other embodiments, such a method can include determining when the locus of points defining the sign(s) and the locus of points defined by the field of view intersect, determining a time frame of the intersection of the locus of points, and determining the content present on the sign(s) during the time frame.

In still other embodiments, such a method can include correlating the brain activity of the user during the time frame to infer an emotional state of the user. Such a method can further include, in other embodiments, downloading instructions to a communications device wearable by the user, wherein such instructions facilitate operations of an eye-tracking device, such as, for example, the eye tracking devices 103, 302, etc. Such a method can be further configured to include conducting a rewards program with respect to the user of the eye tracking device 103, the brain activity-sensing device 103, and the communications device or transceiver 118. In other embodiments, such a method can include locating the eye tracking device 103 and the brain activity-sensing device 102 proximate to an ear mountable pressure transducer, such as, for example, the earphones 302 shown in FIG. 3 and/or the eye-tracking device 302 of FIG. 4.

In still other embodiments, the aforementioned method can include electronically associating data from the eye tracking device and the brain activity-sensing device with a location sensor. In some embodiments, the eye-tracking device can be configured as an eyeball orientation sensor that includes a head orientation sensor and an electrooculograms-type sensor for detecting changes in a polarity in an eye of the user. Additionally, such a method can include determining the eyeball orientation of an eye of the user utilizing a wearable computing device. In yet other embodiments, such a method can include receiving at the eye tracking device 103 and the brain activity-sensing device 102, a data transmission that includes a beacon proximate to the location of the media, and activating the data transmission with respect to a service provider at a remote location based on receipt of the beacon by the communications device.

In some embodiments, the location of the field of view can be detected utilizing one or more of the following: a Global Position Satellite receiver, a wireless network signal, and/or a triangulation system to locate the sign(s) and transmission of the location data associated with the sign(s) to a remote location. In other embodiments, such a method may also include configuring the communications device to record a dwell time length of media viewing data collected from the eye-tracking device 103. Variations to such a method can also include querying the user when the user is in close proximity to the sign(s) regarding a users activity, and accepting feedback from the user with respect to the sign(s). Finally, the eye tracking device 103 and the brain activity-sensing device 102 and a pressure transducer can be arranged in a head mountable configuration.

In still other embodiments, a system and variations thereof, can be implemented. Such a system can include, for example, a processor, such as the processor 112 shown in FIG. 1, a data bus coupled to the processor 112, and a computer-usable medium embodying computer code. Such a computer-usable medium can be coupled to, for example, the aforementioned data bus. Such computer program code can include instructions executable by said processor and configured for determining locations of a plurality of signs in at least two-dimensional space, determining a location of a user, determining a field of view of the user in the at least two dimensional space, determining a direction of the field of view of the user utilizing an eye-tracking device, communicating the direction of the field of view to a remote location, and identifying a location of at least one sign among the plurality of signs that is within the direction of the field of view of the user at the remote location. It can be appreciated that such instructions can be further configured, for example, to process the various steps previously discussed with respect to different embodiments of the disclosed method.

It will be appreciated that variations of the above-disclosed and other features and functions, or alternatives thereof, can be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for acquiring user viewing data, said method comprising:
    determining a location, an outline, and particular content presented by at least one sign in at least three-dimensional space, by executing a program instruction in a wearable data-processing apparatus;
    determining, utilizing data received from a head-mounted eye tracking device detecting at least eye position of the user and coupled to the wearable data-processing apparatus, a location and orientation of an eyeball of the user in the at least three-dimensional space, by executing a program instruction in the wearable data-processing apparatus, the head-mounted eye tracking device detecting the at least eye position by monitoring at least polarity and direction of an eyeball of the user relative to the location;
    determining, utilizing at least the location and orientation of the eyeball of the user, a field of view of the eye of the user in the at least three dimensional space, the field of view defining a three-dimensional section of space visible to the user, by executing a program instruction in the wearable data-processing apparatus;
    determining a probability that the outline of the at least one sign is located in the three-dimensional section of space visible to the user based on the orientation and the location of the signage and the field of view of the eye of the user, by executing a program instruction in the wearable data-processing apparatus;
    determining and recording that the particular content presented by the at least one sign has provided an impression to the user, based on the determining of the probability that the outline is located in the three-dimensional section of space visible to the user, by executing a program instruction in the wearable data-processing apparatus; and
    sending the recorded impressions to a remote computer processor communicatively coupled to the wearable data-processing apparatus.

2. The method of claim 1 further comprising:
    determining a direction of movement of the user, by executing a program instruction in the wearable data-processing apparatus; and
    utilizing the direction of movement of the user to assist in determining the field of view of the eye of the user, by executing a program instruction in the wearable data-processing apparatus.

3. The method of claim 1 wherein the user views the at least one sign utilizing parameters comprising:
    a dwell time;
    the location of the at least one sign;
    the location of the user;
    the field of view of the eye of the user; and
    the direction of the field of view of the eye of the user.

4. The method of claim 3 further comprising utilizing the parameters at a remote location to determine advertising campaign success metrics.

5. The method of claim 3 wherein detecting the direction of the field of view further comprises the head-mounted eye tracking device detecting a difference in electric potential proximate to the eye of the user, and an orientation sensor that provides directional information, by executing a program instruction in the wearable data-processing apparatus.

6. The method of claim 5 further comprising configuring the orientation sensor to comprise a head orientation sensor and an electrooculograms-type sensor for detecting changes in the polarity in the eye of the user, by executing a program instruction in the wearable data-processing apparatus.

7. The method of claim 3 wherein detecting the field of view in at least three dimensional space further comprises utilizing at least one of:
    a direction of movement of the user,
    a head orientation of the user; or
    at least one predetermined distance to limit the locus of points that defines the field of view of the eye of the user.

8. The method of claim 1 further comprising determining a rating valuation of the at least one sign based on a probability that a first number of users have viewed content associated with the at least one sign, and a probability that a second number of users have viewed one or more signs among a plurality of signs by executing a program instruction in the wearable data-processing apparatus.

9. The method of claim 1 further comprising defining the at least one sign utilizing a locus of points in three-dimensional space, wherein the locus of points defines a portion of a plane in three-dimensional space, the portion of the plane defining the at least one sign in three-dimensional space, the portion of the plane having latitudinal and longitudinal coordinates, by executing a program instruction in the wearable data-processing apparatus.

10. The method of claim 9 further comprising determining an intersection of the locus of points defining the field of view with the locus of points defining the at least one sign, by executing a program instruction in the wearable data-processing apparatus.

11. The method of claim 10 further comprising;
    determining a time frame of the intersection, by executing a program instruction in the wearable data-processing apparatus; and determining particular content presented by the at least one sign during the time frame, by executing a program instruction in the wearable data-processing apparatus.

12. The method of claim 11 further comprising:
monitoring brain activity associated with the user utilizing a brain activity-sensing device coupled to the wearable data-processing apparatus;
correlating the brain activity of the user during the time frame; and
assigning a probability that the user has a predefined emotional state during the time frame.

13. The method of claim 1 further comprising defining the field of view utilizing a locus of points in three dimensional space, the field of view defined substantially as in a shape of one of a cone or a pyramid, by executing a program instruction in the wearable data-processing apparatus.

14. The method of claim 1 further comprising:
monitoring brain activity associated with the user utilizing a brain activity-sensing device coupled to the wearable data-processing apparatus, by executing a program instruction in the wearable data-processing apparatus;
identifying content presented by the at least one sign as particular content by generating a real-time view of the section of space including the at least one sign, by executing a program instruction in the wearable data-processing apparatus; and
relating the brain activity, and the particular content presented by the at least one sign when the particular content presented by the at least one sign is within the field of view of the eye of the user, by executing a program instruction in the wearable data-processing apparatus.

15. The method of claim 14 further comprising correlating user viewing data with the brain activity of the user and the particular content, by executing a program instruction in the wearable data-processing apparatus.

16. The method of claim 14 further comprising downloading instructions to a communications device wearable by the user and coupled to the wearable data-processing apparatus, said instructions facilitating operations of the head-mounted eye-tracking device, by executing a program instruction in the wearable data-processing apparatus.

17. The method of claim 16 further comprising conducting a rewards program with respect to the user of the head-mounted eye-tracking device, the brain activity-sensing device, and the communications device, by executing a program instruction in the wearable data-processing apparatus.

18. The method of claim 16 further comprising:
receiving, at the head-mounted eye-tracking device, a beacon transmission that indicates that the eye-tracking device is proximate to the location of the sign; and
activating the locating of the section of space based on receipt of the beacon.

19. The method of claim 16 detecting a location of the field of view utilizing at least one of the following:
a Global Position Satellite receiver;
a wireless network signal;
a beacon; or
a triangulation calculation system to locate the at least one sign and transmit location data associated with the at least one sign to a remote location.

20. The method of claim 16 further comprising integrating the head-mounted eye-tracking device and the brain activity-sensing device and a pressure transducer into a head mountable apparatus.

21. The method of claim 14 further comprising locating the head-mounted eye-tracking device and the brain activity-sensing device proximate to an ear mountable pressure transducer.

22. The method of claim 14 further comprising electronically associating data from the head-mounted eye-tracking device and the brain activity-sensing device with a location sensor, by executing a program instruction in the wearable data-processing apparatus.

23. The method of claim 1 further comprising:
in response to a determination that the user is in close proximity to the at least one sign, querying the user regarding the user's current activity; and
accepting feedback from the user with respect to the at least one sign.

24. A method, comprising:
defining an orientation and a location of signage in three-dimensional space, by executing a program instruction in a wearable data-processing apparatus;
determining a location and orientation of an eyeball of a user in three-dimensional space utilizing data provided by a wearable eye-tracking sensor device detecting at least eye position of the user and coupled to the wearable data-processing apparatus, by executing a program instruction in the wearable data-processing apparatus, the wearable eye-tracking sensor device detecting the at least eye position by monitoring at least polarity and direction of an eyeball of the user relative to the location;
calculating a field of view of the eyeball of the user in three-dimensional space, by executing a program instruction in the wearable data-processing apparatus;
determining a probability that the signage is being viewed by the user based on the orientation and the location of the signage and the field of view of the eyeball of the user, by executing a program instruction in the wearable data-processing apparatus; and
determining and recording that signage content associated with the signage has provided an impression to the user, based at least in part on the determining of the probability; and
sending the recorded impressions to a remote computer processor communicatively coupled to the wearable data-processing apparatus.

25. The method of claim 24 further comprising defining the orientation and the location of the signage as a plane in three-dimensional space utilizing parameters including latitude, longitude and elevation, by executing a program instruction in the wearable data-processing apparatus.

26. The method of claim 24 further comprising defining the location and the orientation of the eyeball of the user as a point in three-dimensional space using latitude parameters including a longitude and an elevation, by executing a program instruction in the wearable data-processing apparatus.

27. The method of claim 26 further comprising determining the elevation based on the latitude and the longitude of the eyeball utilizing a look up table and data contained therein, by executing a program instruction in the wearable data-processing apparatus.

28. The method of claim 24 further comprising, by executing a program instruction in the wearable data-processing apparatus:
calculating the field of view of the eyeball as a locus of points; and
determining an intersection of the signage location data with the locus of points.

29. The method of claim 24 further comprising, by executing a program instruction in the wearable data-processing apparatus:
    monitoring brain activity of the user via a brain activity-sensing device;
    generating brain activity data, in response to monitoring the brain activity of the user via the brain activity-sensing device; and
    transmitting the brain activity data to a remote location.

30. The method of claim 29 further comprising correlating the brain activity data with the probability that signage content associated with the signage is being viewed by the user, by executing a program instruction in the wearable data-processing apparatus.

31. A system for acquiring user viewing, said system comprising:
    a processor;
    a data bus coupled to said processor; and
    a computer-usable medium embodying computer code, said computer-usable medium being coupled to said data bus, said computer program code comprising instructions executable by said processor and configured for:
    determining a location, an outline, and particular content presented by at least one sign in at least three-dimensional space;
    determining, utilizing data received from a head-mounted eye-tracking device coupled to the processor, a location and orientation of an eyeball of the user in the at least three-dimensional space, the head-mounted eye-tracking device detecting the orientation by monitoring at least polarity and direction of the eyeball of the user relative to the location;
    determining, based on the location and orientation of an eyeball of the user, a three-dimensional field of view of the eye of the user in the at least three-dimensional space;
    determining a probability that the outline of the at least one sign is within the three-dimensional field of view of the eye of the user at the remote location based on the orientation and the location of the sign and the field of view of the eye of the user;
    determining and recording that the particular content presented by the at least one sign has provided an impression to the user, based on the determining of the probability that the outline is within the field of view of the eye of the user; and
    sending the recorded impressions to a remote computer processor communicatively coupled to the processor.

32. The system of claim 31 wherein said instructions are further configured for:
    communicating a direction of movement of the user; and
    determining the direction of the field of view of the eye of the user based on the direction of movement of the user.

33. The system of claim 31 wherein the user views the at least one sign utilizing parameters comprising:
    the location of the at least one sign;
    the location of the user;
    the field of view of the eye of the user; and
    the direction of the field of view of the eye of the user.

34. The system of claim 31 wherein determining the field of view in at least three dimensional space further comprises utilizing at least one of:
    a direction of movement of the user,
    a head orientation of the user,
    or
    at least one predetermined distance to limit a locus of points that defines the field of view of the user.

35. The system of claim 31 wherein said instructions are further configured for:
    monitoring brain activity associated with the user utilizing a brain activity-sensing device coupled to the processor;
    identifying content presented by the at least one sign as particular content by generating a real-time view of the section of space including the at least one sign; and
    relating the brain activity and the particular content presented by the at least one sign when the particular content presented by the at least one sign is within the field of view of the eye of the user.

36. The system of claim 31 wherein said instructions are further configured for correlating user viewing data with the brain activity of the user, and particular content presented by the at least one sign.

* * * * *